(12) United States Patent
Liu

(10) Patent No.: US 6,408,314 B1
(45) Date of Patent: Jun. 18, 2002

(54) METHOD OF PERFORMING A HIGH-PERFORMANCE SORT WHICH GAINS EFFICIENCY BY READING INPUT FILE BLOCKS SEQUENTIALLY

(75) Inventor: Peter Chi-Hsiung Liu, Woodcliff Lake, NJ (US)

(73) Assignee: Synscort Incorporated, Woodcliff Lake, NJ (US)

( * ) Notice: Subject to any disclaimer, the term of this patent is extended or adjusted under 35 U.S.C. 154(b) by 0 days.

(21) Appl. No.: 09/347,929

(22) Filed: Jul. 6, 1999

(51) Int. Cl.[7] .............................................. G06F 12/00
(52) U.S. Cl. ......................... 707/205; 707/204; 707/7; 707/10; 711/112; 711/161; 709/200
(58) Field of Search ........................... 707/7, 200, 204; 709/1–10, 200–205, 217–219; 711/161, 162, 154, 111, 112, 114

(56) References Cited

U.S. PATENT DOCUMENTS

| | | |
|---|---|---|
| 4,210,961 A | 7/1980 | Whitlow et al. |
| 4,686,620 A | 8/1987 | Ng |
| 4,760,526 A | 7/1988 | Takeda et al. |
| 5,133,065 A | 7/1992 | Cheffetz et al. |
| 5,150,473 A | 9/1992 | Zulch |
| 5,163,148 A | 11/1992 | Walls |
| 5,210,866 A | 5/1993 | Milligan et al. |
| 5,239,647 A | 8/1993 | Anglin et al. |
| 5,263,154 A | 11/1993 | Eastridge et al. |
| 5,276,860 A | 1/1994 | Fortier et al. |
| 5,276,865 A | 1/1994 | Thorpe |
| 5,321,832 A | 6/1994 | Tanaka et al. |
| 5,347,653 A | 9/1994 | Flynn et al. |
| 5,357,607 A | 10/1994 | Sathi et al. |
| 5,367,669 A * | 11/1994 | Holland et al. ................ 714/7 |
| 5,367,698 A | 11/1994 | Webber et al. |
| 5,404,508 A | 4/1995 | Konrad et al. |
| 5,408,654 A * | 4/1995 | Barry ........................ 707/101 |
| 5,410,694 A | 4/1995 | Uchida et al. |
| 5,416,840 A | 5/1995 | Cane et al. |
| 5,448,718 A | 9/1995 | Cohn et al. |
| 5,475,834 A | 12/1995 | Anglin et al. |
| 5,479,654 A | 12/1995 | Squibb |
| 5,485,608 A | 1/1996 | Lomet et al. |
| 5,497,483 A | 3/1996 | Beardsley et al. |
| 5,513,314 A | 4/1996 | Kandasamy et al. |
| 5,519,860 A | 5/1996 | Liu et al. |
| 5,546,536 A | 8/1996 | Davis et al. |
| 5,557,770 A | 9/1996 | Bhide et al. |

(List continued on next page.)

OTHER PUBLICATIONS

What Is, "NTFS (NT file system)," http://www.whatis.com/htfs.htm, web site printout dated Apr. 15, 1999.

(List continued on next page.)

Primary Examiner—Kim Vu
Assistant Examiner—Joon Hwan Hwang
(74) Attorney, Agent, or Firm—Hughes Hubbard & Reed LLP; Ronald Abramson; Sheryl L. Sandridge

(57) ABSTRACT

An improved method of performing a sort-merge operation on a digital computer is disclosed, which gains efficiency by reading input file blocks sequentially. The method takes into consideration the fact that records can be read in any order if they are subsequently to be sorted. Input from disk is processed by reading the working disk directory maintained by the operating system to determine all of the blocks associated with the input data to be sorted. The data block identities so determined are sorted in accordance with their physical location on the disk, thereby providing a sequential order for reading. The input data is read in this sequential order, and then, using largely conventional methods, sorted into one or more strings and merged as necessary to form the fully sorted output. Since the original record order in the file is known from the working directory that has been read, that order can be utilized if and as necessary, for example to preserve the original order of records with equal keys.

4 Claims, 8 Drawing Sheets

U.S. PATENT DOCUMENTS

| | | |
|---|---|---|
| 5,559,991 A | 9/1996 | Kanfi |
| 5,574,906 A | 11/1996 | Morris |
| 5,586,322 A | 12/1996 | Beck et al. |
| 5,592,665 A | 1/1997 | Lahaije |
| 5,604,862 A | 2/1997 | Midgely et al. |
| 5,617,566 A | 4/1997 | Malcolm |
| 5,649,196 A | 7/1997 | Woodhill et al. |
| 5,659,743 A | 8/1997 | Adams et al. |
| 5,684,991 A | 11/1997 | Malcolm |
| 5,715,452 A * | 2/1998 | Mori et al. ............... 395/617 |
| 5,720,026 A | 2/1998 | Uemura et al. |
| 5,737,763 A | 4/1998 | Hildtich |
| 5,761,667 A | 6/1998 | Koeppen |
| 5,765,173 A | 6/1998 | Cane et al. |
| 5,802,344 A | 9/1998 | Menon et al. |
| 5,819,802 A | 10/1998 | Marion |
| 5,829,045 A | 10/1998 | Motoyama |
| 5,842,222 A | 11/1998 | Lin et al. |

OTHER PUBLICATIONS

What Is, "cluster," http://www.whatis.com/cluster.htm, website printout dated Apr. 15, 1999.

Via–Centrale Réseaux, "NTFS Documentation," http//www.via.ecp.fr/~regis/ntfs/new, web site printout dated Apr. 14, 1999.

Via–Centrale Réseaux, "NTFS Documentation: FILE record," http://www.via.ecp.fr/~regis/nfts/new/FILE.html™inode, web site printout dated Apr. 15, 1999.

Via–Centrale Réseaux, "NTFS Documentation: Glossary," http://www.via.ecp.fr/~regis/ntfs/new/glossary.html#File, web site printout dated Apr. 15, 1999.

Via–Centrale Réseaux, "NTFS Documentation: $MFT," http://www.via.ecp.fr/~regis/ntfs/new/MFT.html, web site printout dated Apr. 15, 1999.

Mark Russinovich, "Inside NTFS: NT's native file system—past, present and future," http://www.scit.wlv.ac.uk/~cm1924/scitcd/reading/filesys/ntfs/.html, web site printout dated May 31, 2000.

Frank Sorenson, "About Hard Disk[a]," http:/pel.cs.by-u.edu/~sorenson/research/disks.html, web site printout dated May 31, 2000.

Eliezer Levy and Avi Silberschatz, "Incremental Recovery in Main Memory Database Systems," IEEE Transactions on Knowledge and Data Engineering, vol. 4, No. 6, pp. 529–540, Dec. 1992.

David A. Solomon, "Inside Windows NT: Windows NT File System (NTFS)," Second Edition, pp.395–450 (Microsoft Press 1998).

Donald E. Knuth, "The Art of Computer Programming: Sorting and Searching," vol. 3, Second Edition, pp. 248–251; 356–379 (Addison–Wesley 1998).

* cited by examiner

METHOD OF PERFORMING A HIGH-PERFORMANCE SORT WHICH GAINS EFFICIENCY BY READING INPUT FILE BLOCKS SEQUENTIALLY

BACKGROUND OF THE INVENTION

1. Field of the Invention

This invention generally relates to the field of data processing and more particularly to high-performance sorting of data in computer systems.

2. Description of the Related Art

Prior art methods for sorting data sets which may be too large to fit within the memory of a computer generally involve a process of sort-merging, wherein data is sorted in units as large as available memory can handle (the "internal" sort), output as "strings", and then the strings are "merged," by successive operations if necessary, until the result is a single fully sorted string.

There is a vast body of technology which has developed in connection with sorting and merging. Much of this technology concerns improved methods for internally sorting, improved methods for merging, and improved methods of communicating with disk drives and other I/O devices during the sort merge process. Early work in this area in the context of disk-based sort-merge operations is reflected in the commonly assigned patent, U.S. Pat. No. 4,210,961.

Making the usual assumption that one will not be writing output over the input file, it follows that at a minimum, the sort-merge process involves copying the input to the output. Where the input resides in a disk file, part of this process is simply reading the entire input file from disk. However, relatively little of the prior research activity in this area has been directed to the manner of reading the input file.

Conventionally, the input file in a sort-merge process is accessed in accordance in the normal manner provided by the operating system, in which data is read from the disk in the logical order of file contents. The actual physical blocks of data on the disk corresponding to each file are not, however, generally stored in a contiguous or linear order. In practice, there is considerable physical discontinuity of recorded data blocks, both within individual files, and from file to file in a disk file system. Indeed, even if linearly recorded at the outset, the data blocks of files in a production computer system may become highly fragmented as blocks are read, revised and written over the course of normal usage. Even a newly created file may be fragmented if its data is larger than the next free spaces made available by the operating system. In normal operation, the operating system takes care of this, maintaining a directory which keeps track of the correspondence between the blocks of data that comprise a file, and the physical location of each block on the storage media. Yet in most operating systems the physical order of blocks is generally allowed to become discontinuous and fragmented.

The result of this disorder and fragmentation of raw disk data is that the process of reading files using normal operating system calls (or any other disk access methods that operate similarly) generally results in significant disk read head repositioning during the read operation. Since this mechanical movement can be the slowest operation on the computer, sometimes by orders of magnitude, reading a disk in this manner can be highly inefficient, and the delays involved can be significant, even compared to the time required to completely sort random file contents. A sort-merge job that is constrained to read the disk in this manner will thus necessarily suffer from this significant inefficiency. Considerable improvement in sort-merge operations can be obtained if this inefficiency can be overcome.

BRIEF SUMMARY OF THE INVENTION

Accordingly, it is an object of the present invention to provide an improved sort-merge method which avoids the inefficiencies of normal disk access during input. Among the objects of the present invention, therefore, are the following:

To reduce disk read time by reducing the amount of head repositionings necessary to read the sort input;

To achieve such reduction by performing sequential rather than random reads of the input file, to the extent feasible; and Despite having read the file in a physical sequential order, being able to keep track of the logical sequence of blocks as well, so that aspects of the original record order can be maintained in the sorted output if so specified by the user.

The foregoing and other objects of the invention are accomplished by taking into consideration the fact that records can be read in any order if they are subsequently to be sorted. Thus, input from disk can be processed by reading the working directory maintained by the operating system to determine all of the blocks associated with the input data to be sorted. The data block identities so determined are sorted in accordance with their physical location on the disk, thereby providing a sequential order for reading. The input data is read in this sequential order, and then, using largely conventional methods, sorted into one or more strings and merged as necessary to form the fully sorted output. Since the original record order in the file is known from the working directory that has been read, that order can be utilized if and as necessary, for example to preserve the original order of records with equal keys.

The manner in which the invention achieves these objects is more particularly shown by the drawings enumerated below, and by the detailed description that follows.

BRIEF DESCRIPTION OF THE DRAWINGS

The following briefly describes the accompanying drawings.

DETAILED DESCRIPTION OF THE PREFERRED EMBODIMENT

Figure 5A:
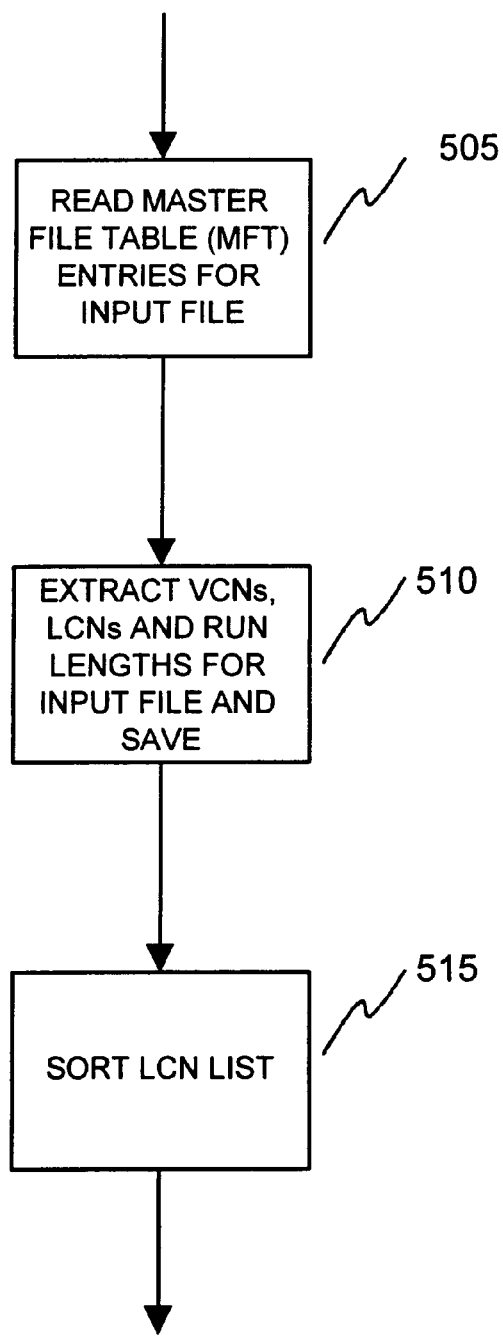
FIGS. 5A and 5B are flow charts showing how the present invention modifies the "string generation phase" of the conventional sort-merge process.
Figure 5B:
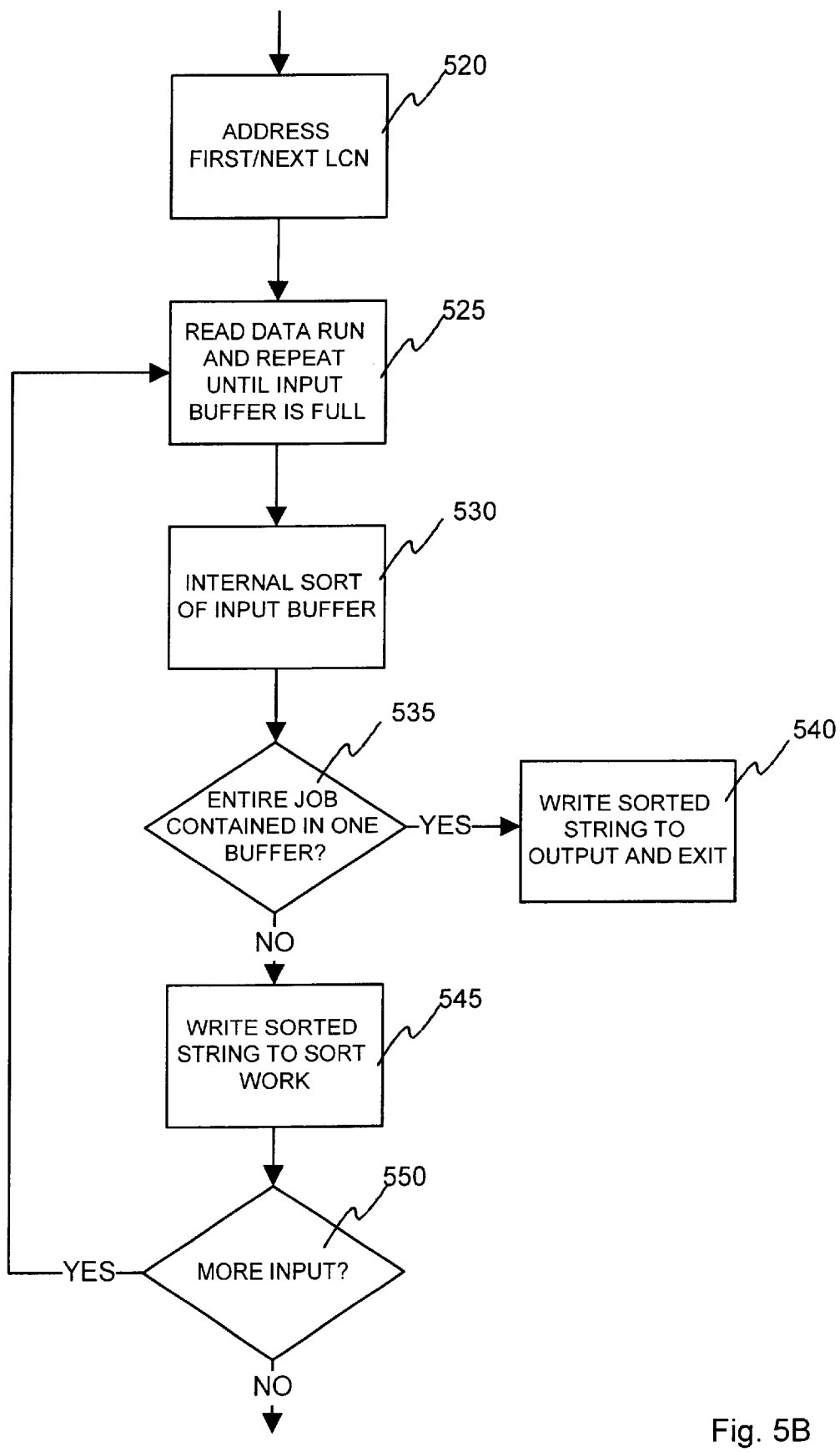

The preferred embodiment of the invention is illustrated in FIGS. 5A–5C, and described in the text that follows. The preferred embodiment is a sort-merge system implemented under the Microsoft Windows NT operating system, operating on large disk storage devices which have been formatted under the NTFS file system. Although the invention has been most specifically illustrated with a particular preferred embodiment, its should be understood that the invention concerns the principles by which such embodiment may be constructed, and is by no means limited to the specific configuration shown.

Figure 1:
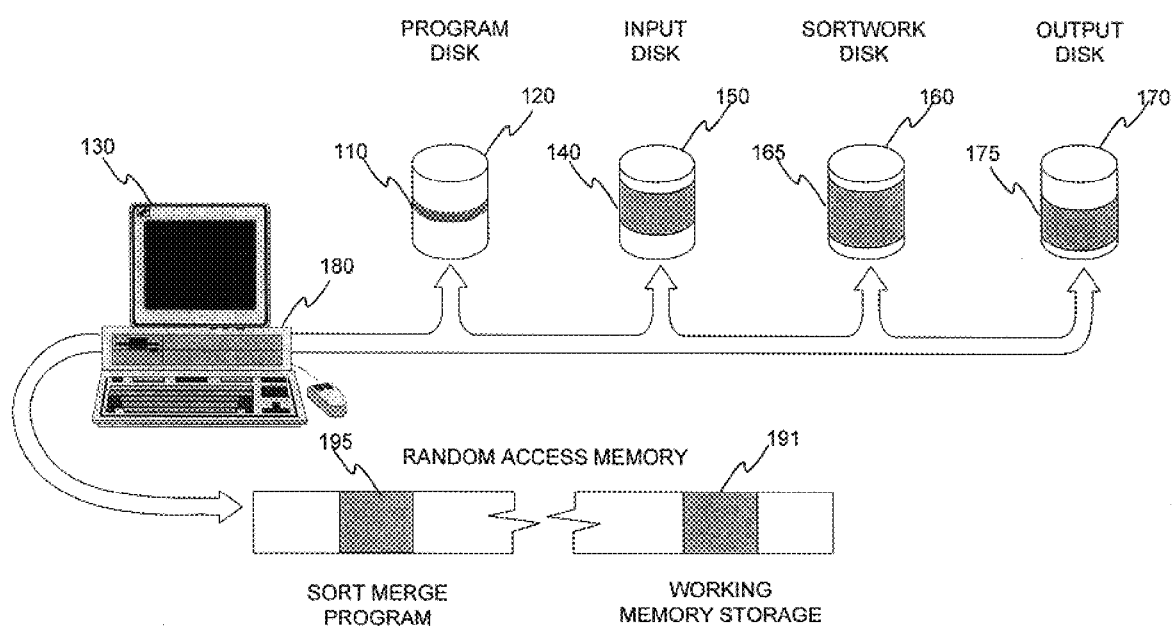
FIG. 1 shows an exemplary configuration of the computer hardware involved in the sort-merge process.

A typical computer hardware configuration for performing a sort-merge of specified data is shown in FIG. 1. As shown therein, a sort-merge program 110 stored on disk 120 of workstation 130 is used to sort the data set 140 residing on input disk 150. The program is loaded into a portion 195 of random access memory 190, and run on central processing unit 180. Input data is read into a working portion 191 of random access memory, and sorted with an internal sort procedure. Strings generated by internal sorting are stored in "sort work" space on disk drive 160. Final output is written to disk drive 170. Of course, innumerable other hardware configurations are possible; the present configuration has been chosen merely for ease of presentation.

Figure 2A:
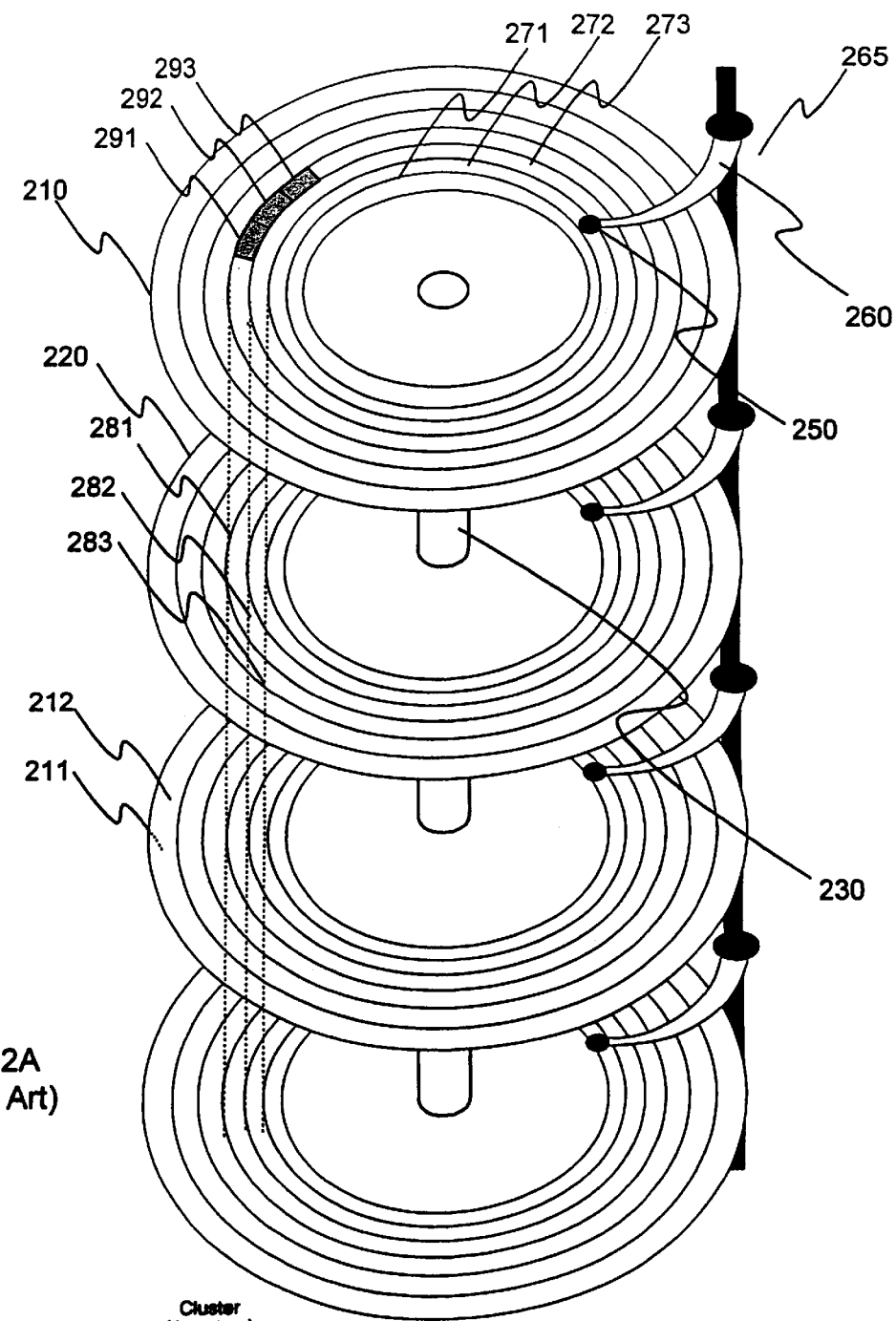
FIG. 2A is diagram showing the geometry of an exemplary disk drive storage device.

A possible geometry for the input disk drive 150 is shown in FIG. 2A. The storage areas of the device comprise a plurality of stacked platters 210, 220, etc.. which spin in unison on a spindle 230. Each platter has two surfaces, 211, 212, one or both of which may be used for data storage.

The surfaces are accessed with one or more read/write heads 250, etc. mounted on corresponding arms 260, etc., which are also movable in unison as a single structure 265 in a stepwise fashion so as to address narrow concentric rings 271, 272, 273, etc. on each surface. These rings are called "tracks." The movement of arm structure 265 is such that the read/write heads move in and out across the surface so as to address tracks at different radii from the center of the spindle.

A set of vertically stacked tracks (i.e., one for each surface) is called a "cylinder" (281, 282, 283, etc.). Within each track are a series of "sectors" (291, 292, 293 etc.).

The term "latency" refers to the rotation time delay in having a given sector spin around so as to be under the corresponding head. The term "seek" time refers to the time delay resulting from having to reposition the read/write arm structure 265 so as to address a different set of tracks. Of all disk operations, seeking a new cylinder is by far the most time consuming.

Conventionally, data stored in disk files are physically written on the disk in fixed length data units which are sometimes referred to as "blocks." Under the NTFS file system employed in connection with the preferred embodiment, the term "cluster" is most often used to denote such blocks.

Figure 2B:
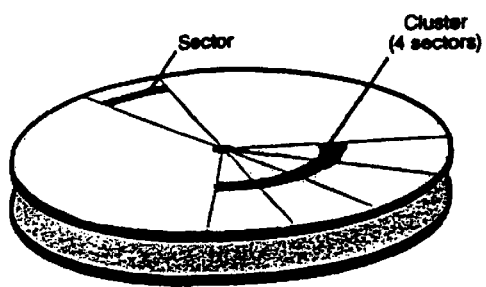
FIG. 2B is a diagram representing sectors and a cluster on an exemplary disk.

Under the NTFS file system, a "sector" generally consists of 512 bytes, and a "cluster" consists of a power-of-two multiple number of sectors. One example showing a cluster size of four sectors is shown in FIG. 2B. In most situations involving a volume size in excess of 2 gigabytes, a "cluster" comprises eight sectors, thereby providing 4,096 bytes (4K) of storage.

The NTFS stores disk directory and file information in a Master File Table (MFT). The MFT holds numerous disk, directory and file attributes. Within the information maintained on each file in the MFT are two series of cluster numerations, which keep track of data clusters in a file. The first, the "Virtual Cluster Number" (VCN), refers to the order of the data in the file, starting at 0 and running to the last cluster, for example, the mth cluster. The second number, the "Logical Cluster Number" (LCN) represents the numbering of all physical clusters, from the beginning of the volume to the end. LCNs may be converted to a physical disk address by multiplying the LCN by the cluster factor (number of bytes per cluster) to get the physical byte offset on the volume. From this, the disk driver interface can readily calculate platter, track and sector addresses so as to accurately position the disk read head.

Note that there is nothing that requires that the VCNs denoting the data clusters comprising a file to be stored in a contiguous manner on the disk, or even that they be recorded in order. Indeed, as discussed above, it is very often the case that a file's VCNs are neither contiguous or in order.

Figure 3:
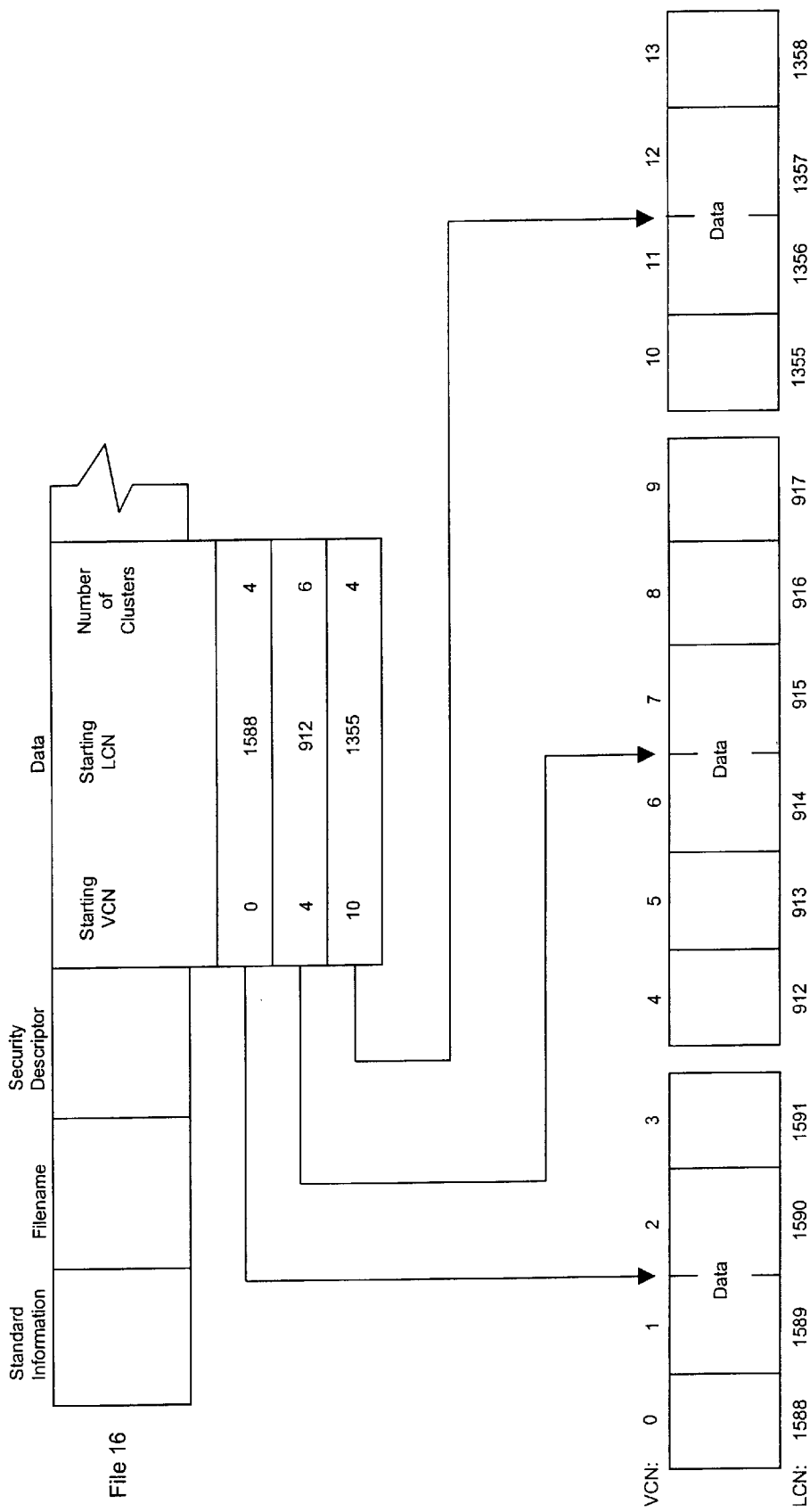
FIG. 3 is a diagram of VCN to LCN cluster and data Run mappings for an exemplary large data file under the NTFS file system.

File data are stored in "Runs" each comprising a plurality of contiguous clusters, or in some cases a single isolated cluster. For each Run, there is stored in the MFT a record of the starting VCN, the starting LCN, and the number of clusters in the Run. Thus, the physical location and logical order of all of the data in the file is accounted for. A representative layout of a typical large file under NTFS (showing data contents fragmented and not in physical order) is shown in FIG. 3.

Figure 4A:
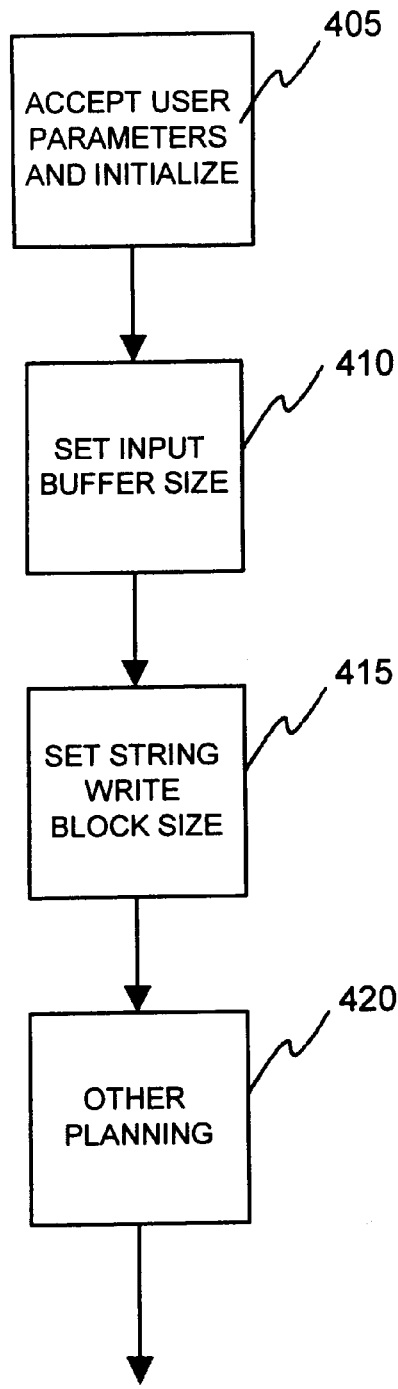
FIGS. 4A, 4B, and 4C are flow charts reflecting the order of processing in a prior art sort-merge process.
Figure 4B:
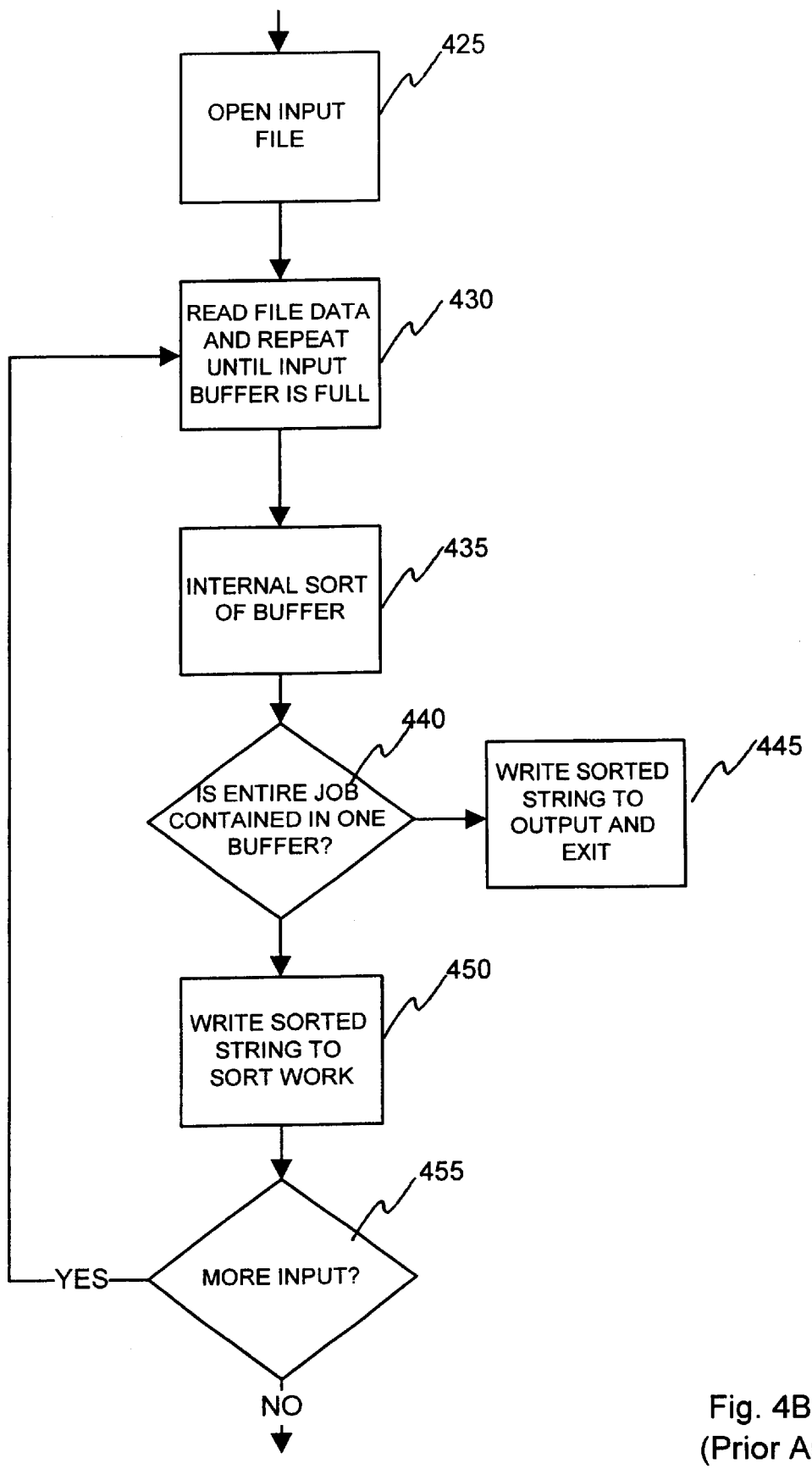
Figure 4C:
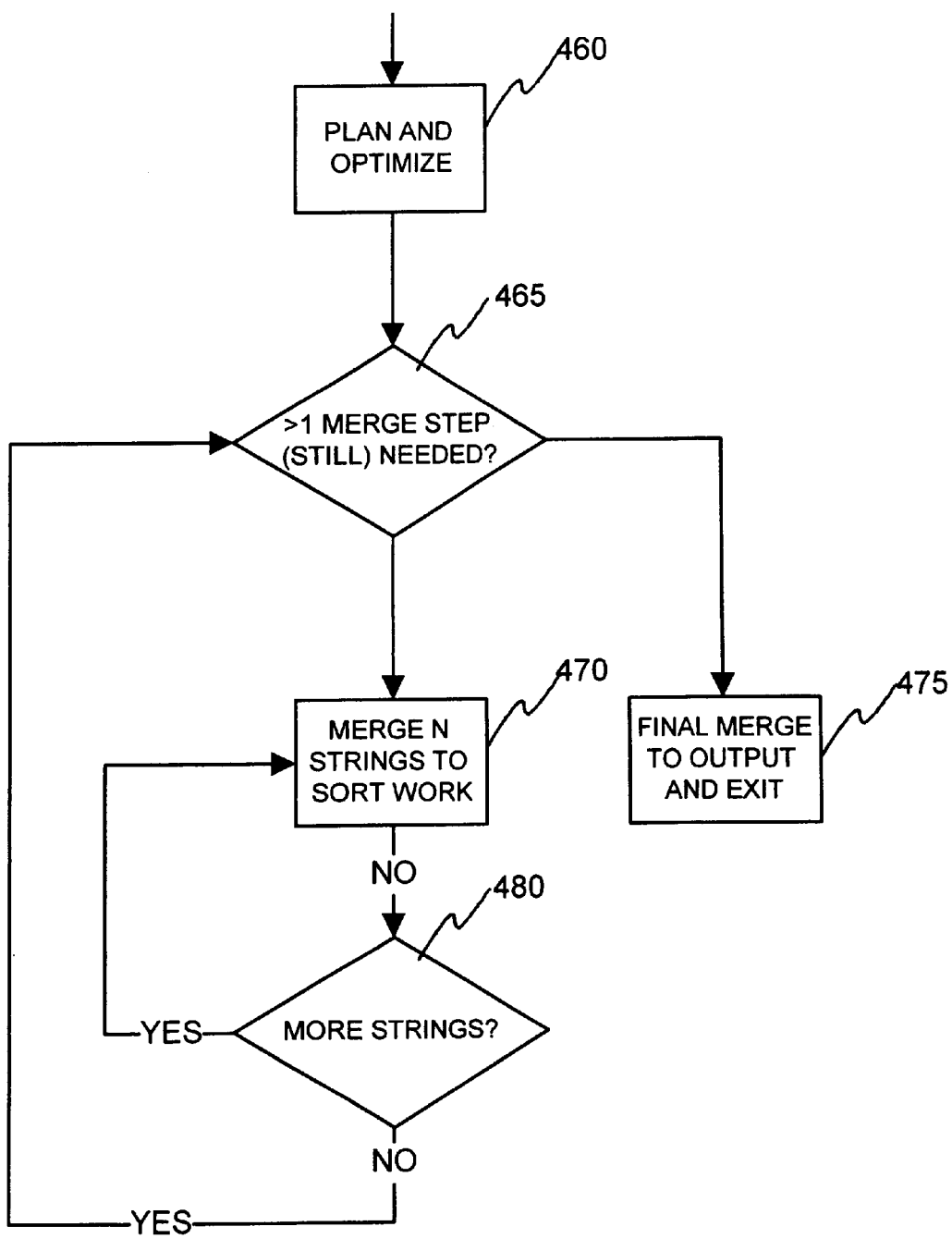

For purposes of comparison with the present invention, the conventional sort-merge process is summarized in the flow charts of FIGS. 4A, 4B and 4C.

The conventional process comprises the three phases, commonly referred to as the "pre-string generation phase," the "string-generation phase," and the "merge phase" (the latter itself comprising "intermediate" and "final" merge phases).

In the pre-string generation phase, user parameters, such as input file ID, sort key, etc. are accepted and processed and preliminary initialization performed 405. Pre-string generation actions include setting the input buffer size 410 (preferably, an integral multiple of the cluster size on input disk 150) and the block size for writing sorted strings 415. Other pre-string generation actions may be performed 420 in order to plan for subsequent processing.

In the string generation phase, the input file 140 is opened 425, and read in increments of the buffer size previously set (loop 430—455). Each buffer-full is sorted 435 in accordance with a suitable internal sorting algorithm. If the results of the entire job are fully contained within the first sorted buffer, that sorted buffer is written directly to the output file 175 and the process terminated. Otherwise each successive sorted buffer is written out 450 as an internally sorted "string" to the sort work storage area 165.

In the merge phase, the generated strings are successively merged in accordance with a suitable "n-way" merging algorithm, where "n" is the "order of merge," i.e., the number of strings being merged together in the merge operation or "merge step." Prior to beginning actual merging, there may be another planning and optimization process 460. If the number of strings in the sort work area are less than the maximum order of merge (i.e., the maximum number of strings that may be merged at once, generally a function of block size and available working memory), a single "final" merge of these strings is performed, and a single, fully sorted string is written to the output file 175. Otherwise, n strings (where n is the then present merge order) at a time are merged and written to sort work, and the process is repeated (loop 480–470) with each successive group of n strings until all strings in the "merge phase" have been merged. This "merge phase" processing is in turn iteratively performed, if necessary (loop 480–465), each time producing fewer, longer strings, until a final merge 475 may be performed, wherein a single fully sorted string is written to the output file 175.

The operation of the preferred embodiment can now be explained with reference to the disk and file structures and prior art sort-merge techniques described above.

The present invention differs from the prior art sort-merge process primarily with regard to the steps comprising the string generation phase. FIGS. 5A and 5B are flow charts showing how string generation proceeds in accordance with the preferred embodiment of the present invention.

We will assume for purposes of presentation that pre-string generation and merging will proceed substantially as handled in prior art systems (improvements in those phases that are keyed to the present invention are possible, however).

In the string generation phase in accordance with the present invention, the MFT entries for input file 140 are read 505 from input disk 150. The MFT may be located on the disk by following a reference in the drive's boot record.

The file attribute information is extracted 510 from the MFT. This information includes the VCNs, LCNs and Run lengths of the cluster Runs comprising the file, as well as any other attributes desired for other purposes. This information is temporarily stored in memory.

The LCN data extracted in this manner is then sorted 515 into a list consisting of a list of cluster numbers, using any suitable sorting algorithm, preferably a high-performance sort such as SyncSort NT™, a product of Syncsort Incorporated, assignee of the present application. The result is a list of cluster addresses arranged in a monotonic sequence. The Runs of specified lengths, beginning at these LCNs, may then be entirely read in one linear sweep of this disk. While this may require a series of head seeks, they are all in the same direction, and the sum of the length of all head movements is limited and in fact equal to the physical span from the first to the last cluster included in input file 140. This is potentially a very substantial saving in head movement as compared with reading input file 140 in VCN order.

The string generation processing is performed as follows: starting from the lowest sorted LCN number 520, the system reads the specified number of clusters (i.e., the corresponding Run-length), starting from the designated LCN, into the input buffer in random access memory of the computer 130. This read process is repeated (loop 550–525), advancing each time to the next LCN and Run, until a buffer-full of clusters has been read from the disk. Preferably, a double or rotating buffer scheme is employed, and in order to completely fill buffers, Runs are split as necessary between the end of one buffer-full and the beginning of the next. Exact buffer size is a matter of tuning, and will vary from system to system.

After each buffer-full is read, it is internally sorted 530 in accordance with a suitable internal sort algorithm, and otherwise processed in a largely conventional manner. If the results of the entire job are fully contained within the first sorted buffer, that sorted buffer is written directly 540 to the output file 175 and the process terminated. Otherwise each successive sorted buffer is written out 540 as an internally sorted string to the sort work storage area 165. The merge phase then follows.

In addition to what has just been described, other modes of operation are possible. For example, original record order can be reconstructed from the saved LCN and VCN data if necessary, for example, to order records having equal keys.

While the present invention has been described by reference to a particular implementation in connection with the NTFS file system, it is well known to those skilled in the art that conceptually, the basic layout and organization of that file system is very similar to file systems encountered under the UNIX and common mainframe operating systems, as well as to somewhat more limited FAT scheme employed under MS-DOS. The method of the present invention may be readily adapted any of such operating systems and files systems, and will perform correspondingly well in those respective environments.

Thus, it is apparent that a considerable improvement in the sort merge process is made possible by the present invention, wherein sequential reading rather than the much more time consuming random reading, may be used to read the entirety of the input file. While the presently existing embodiment has been described in detail, it will be apparent to those skilled in the art that the principles of the invention are readily adaptable to other hardware configurations and operating systems without departing from the scope and spirit of the invention, as defined in the following claims.

I claim:

1. An improvement in a sort-merge process carried out upon an input file stored on an input disk in the form of a direct access storage device which is made available to a digital computer, said input file to be sorted and stored in sorted form in an output file, said process comprising a pre-string generation phase, a string generation phase and a merge phase, wherein the improvement comprises the following steps conducted within said string generation phase:

a) reading the directory data prior to reading the data of said input file, for said input file from said input disk and determining therefrom the physically contiguous runs of data on said input disk associated with said input file and information about the location of said runs on said input disk;

b) sorting said location information with regard to all of said runs and thereby determining the physical order of said runs on said input disk;

c) sequentially reading into random access memory of said computer in accordance with said determined physical order, blocks of data comprised of input from said runs; and d) sorting each such block of data and writing it to sort work if necessary, or if not necessary, to the output file.

2. The method of claim 1 further comprising:

a) saving said directory data;

b) determining therefrom the original order of records in the input file;

c) using said original order to order records in the output file having equal sort keys.

3. An article of manufacture comprising a data storage medium on which there has been recorded a computer program which when executed on a suitable computer system performs the methods of claims 1 or 2.

4. A system comprising a general purpose digital computer in which there has been loaded into the appropriate memory and instruction storage areas a computer program which when executed performs the methods of claims 1 or 2.

* * * * *